Sept. 9, 1952     I. R. FLETCHER, SR     2,609,705
BRAKE PEDAL EXTENSION FOR MOTOR VEHICLES
Filed March 23, 1951
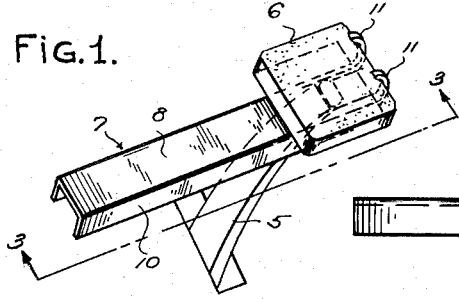
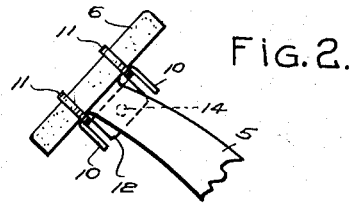
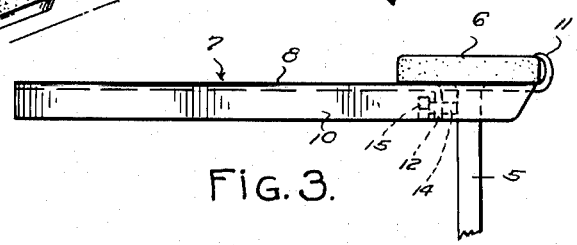
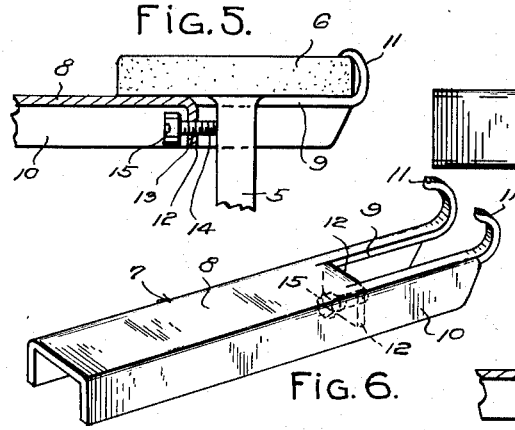
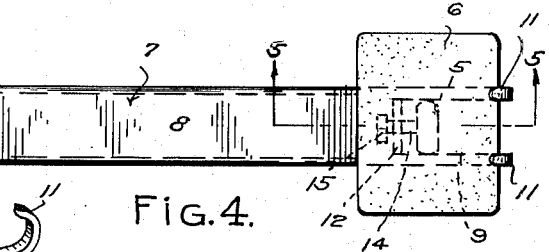
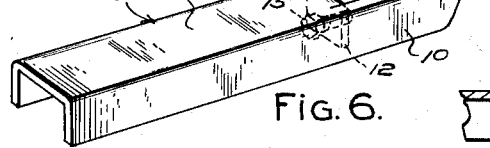
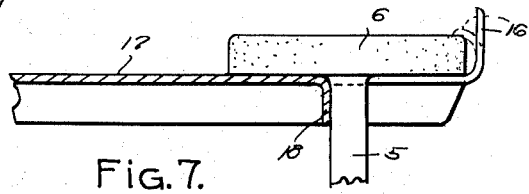
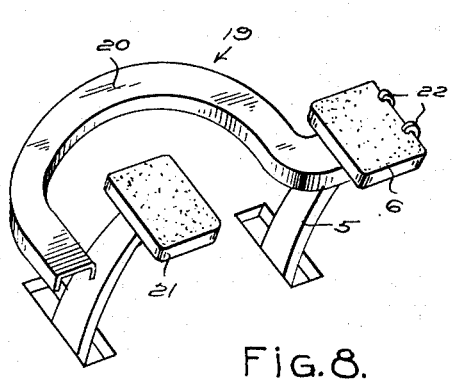
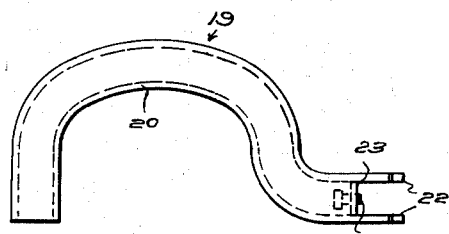
INVENTOR.
IRBY R. FLETCHER, SR.
BY
ATTORNEY.

Patented Sept. 9, 1952

2,609,705

UNITED STATES PATENT OFFICE 2,609,705

BRAKE PEDAL EXTENSION FOR MOTOR VEHICLES

Irby Ray Fletcher, Sr., Opa Locka, Fla.

Application March 23, 1951, Serial No. 217,101

4 Claims. (Cl. 74—562.5)

This invention relates to improvements in foot brake extensions for motor vehicles.

It is an object of the present invention to provide a lateral bar or pedal that is rigid with the conventional brake pedal whereby the operator of a vehicle may maintain constant control of the conventional accelerator pedal and at the same time have constant control of the brake pedal with the left foot, through the medium of the pedal extension and while maintaining the left foot in a normal driving position.

Many drivers of vehicles find that it is necessary to constantly actuate the accelerator pedal for several reasons, one being, that frequently an engine may be running uneven with the likelihood that it will stall if the foot is entirely removed from the accelerator or, that the operator desires to maintain simultaneous control of the brake and accelerator when approaching intersections of highways or a stop light, thus giving him perfect control of the vehicle for a prompt getaway or a traffic congestion, without the necessity of employing the left foot crossed over to engage the brake pedal while the right foot is actuating the accelerator pedal.

Another object of the invention resides in a simple and novel brake pedal extension that is quickly and easily connected with the conventional brake pedal in a rigid manner whereby pressure exerted upon the extension pedal, will be transmitted to the brake pedal and with the extension being of an adequate length to terminate in the area that has been commonly occupied by a clutch pedal in older vehicles and wherein the operator customarily rests his left foot, thus establishing a foot brake operating medium accessible to both feet of the operator in the normal manner. Modern, or late model motor vehicles having automatic transmissions are not equipped with a clutch pedal and the brake extension of this application will not be retarded in its use by such pedals.

Another object of the invention resides in a novel foot brake extension that is constructed in a manner similar to that above described, but is adapted to be used with the older models of vehicles having clutch pedals and in this respect, the extension is rigidly mounted as before, but is curved in a manner to pass around the clutch pedal without interference therewith and with its terminal end positioned to the left of the clutch pedal for convenient engagement by the left foot of the operator.

Other novel features of construction will be readily apparent during the course of the following description, reference being had to the accompanying drawings, wherein has been illustrated the preferred forms of the device and wherein like characters of reference are employed to denote like parts throughout.

In the drawings:

Figure 1 is a perspective view of a conventional brake pedal showing the invention applied thereto, Figure 2 is an end view of the device with the brake pedal in side elevation, Figure 3 is a front view of the pedal and extension, taken along the line 3—3 of Figure 1, Figure 4 is a top plan view of the pedal and extension, Figure 5 is an enlarged fragmentary vertical section, taken on line 5—5 of Figure 4, Figure 6 is a perspective view of the pedal extension prior to mounting, Figure 7 is a view similar to Figure 5, showing a slightly modified form of the device, Figure 8 is a perspective view of conventional brake and clutch pedals, showing the invention applied thereto and as modified from Figure 1 and, Figure 9 is a top plan view of the pedal extension of Figure 8, prior to mounting.

Referring specifically to the drawings and particularly to Figures 1 to 6 inclusive, the numeral 5 designates a conventional foot brake operating pedal as commonly employed in motor vehicles. The pedal is equipped with the usual foot pad or head 6, that may partake of various shapes, such as rectangular, round or oval.

My pedal extension comprises a bar, preferably of channel form, indicated at 7. At one end, the web 8 of the bar is cut away, as at 9 and the side flanges 10 are partially removed to provide a pair of identical tongues 11, that are curved upon themselves, as shown. A portion of the web 8 is bent downwardly to form a tongue or web 12 that is arranged at a right angle to the web 8 and spans the channel for its major width. The web 12 is drilled and tapped at 13, for the threaded reception of a clamping screw 14, having an actuating head 15.

In the use of this preferred form of the invention, when it is desired to attach the pedal extension to the brake pedal 5, the operator backs the screw 14 outwardly. The forked end of the pedal extension is then engaged over the shank of the pedal 5 and the tongues 11 hooked over the pad 6 of the pedal and the bar 7 then swung upwardly to lie against the underside of the pedal pad 6. Holding the bar in this position, the operator then engages the head 15 of the screw 14 with a suitable tool and adjusts the screw until it securely binds against the shank of the pedal 5. The curvature of the tongues 11 readily adapt them to pedal pads of varying thicknesses and contours. Thus, through the medium of the tongues 11 and the binding screw 14, the bar is rigidly held to the brake pedal against twisting or rocking and will travel with the pedal under all conditions. Likewise, pressure exerted upon the bar 7 by the foot of the operator, will be transmitted to the brake pedal 5 for an application of the vehicle brakes. The bar 7 is of a length to overlie the area that was formerly occupied by the conventional clutch pedal. While the bar 7 has been shown as being of channel formation, it will be apparent that other cross-section configurations may be employed with equal success. The bar is easily removed from the pedal 5 by merely backing off the screw 14. It will be apparent, that the positioning of the web 12 will be such as to afford suitable clearance over the shank of the pedal 5 to permit the tongues 11 to be hooked over the pad 6 and to accommodate the device to pedal pads of varying diameters. The bar 7 may be formed of any suitable rigid metal calculated to sustain pressure on its extremity without flexing.

The slightly modified form of the device as illustrated in Figure 7, is adapted to be mounted upon the brake pedal 5 without the use of screw devices. In this form of the invention, the tongues 16, formed by the cutting away of the bar 17, are similar to that previously described, but instead of curving the tongues upon themselves, they are bent upwardly at a right angle from the bar, while the web 18 is bent to a position relatively closer to the tongues and is imperforate, as shown. The web 18 serves to frictionally engaged the side of the shank 5 of the pedal without additional clamping means.

In the use of this form of the invention, the operator engages the forked end of the bar over the pedal shank 5 until the web 18 contacts the shank. The bar is then shifted upwardly until it lies against the under side of the pedal pad 6 and while held in this position, the tongues 16 are bent downwardly over the edge of the pedal pad 6 by a suitable tool, such bending rigidly binding the web 18 against the shank 5 and, with the tongues rigidly gripping the pedal pad 6, the bar 17 is held against twisting or shifting under pressure exerted thereon by the foot of the operator. To remove the device, it is necessary to bend the tongues 16 upwardly again, after which the bar 17 can be shifted downwardly and removed. This form of the invention presents a novel pedal extension requiring a minimum of manufacturing cost.

In the form of the invention shown in Figures 8 and 9, the device has been adapted to those vehicles that are equipped with both the brake and clutch pedals. The device of this form of the invention is indicated as a whole by the numeral 19 and embodies the same channel bar 20 that has been formed upon an arc to extend either over or under the clutch pedal 21, whereby the clutch pedal 21 may be actuated without interference from the extension 19. The free end of the extension 19 terminates preferably to the left side of the clutch pedal 21 where adequate space is available and whereby normally the operator rests his left foot during the operation of the vehicle. The opposite end of the extension 19 is slotted and provided with the curved tongues 22 and web 23 having the clamping screw 24, similar to that illustrated in Figures 1 to 6. The mounting of the extension 19 is identical to that described in connection with Figures 1 to 6.

It will be apparent from the foregoing, that very novel forms of foot brake extension devices have been provided. The structures are strong, durable, cheap to manufacture and are highly efficient in use. The devices are easy to install and provide a very desirable foot brake extension that enables the operator to maintain a more flexible control of the vehicle at all times. It has been customary heretofore for the operator to maintain his right foot in constant engagement with the accelerator and to cross over with his left foot to maintain control of the brake pedal, thus presenting a very awkword driving position. With the improved brake pedal extension, the operator controls both the accelerator and the foot brake in a normal position of driving. The form of the device illustrated in Figures 8 and 9 increases the flexibility of vehicle control without in any way interfering with the conventional operation of the brake and clutch pedal.

It is to be understood, that the invention is not limited to the precise construction and arrangement, but that various changes in the shape, size and arrangement of parts may be resorted to as readily fall within the spirit of the invention or the scope of the subjoined claims.

Having described my invention, what I claim as new and desire to secure by Letters Patent is:

1. An extension pedal for detachable use with the foot brake pedal of a motor vehicle, the foot brake pedal having a shank and a foot engaging pad, the extension pedal including a rigid channel bar that is provided at one end with a pair of spaced hook shaped tongues for hooking engagement over the edge of the pad with the bar underlying the pad, a web formed on the bar and positioned parallel with the pedal shank, a clamping screw carried by the web for engagement with the shank, the clamping screw in adjusted position maintaining the tongues in rigid gripping action with the pad.

2. An extension pedal for use with vehicle foot brakes that have a shank and a foot pad, the extension consisting of a channel bar that is slotted at one end to form spaced parallel portions terminating in hook shaped tongues at their terminal ends, a web portion struck downwardly from the channel at the terminus of the cut away portion, the web provided with a clamping screw, the extension adapted to engage the foot pedal with the shank engaging in the slot of the bar and with the tongues having hooked engagement over the pedal pad at one side, the clamping screw in adjusted position engaging the side of the shank opposite to the hook engaged side for rigidly maintaining the tongues in gripping position upon the pad, the bar adapted to engage the under side of the pad and extended laterally in a horizontal plane for foot engagement.

3. A foot brake extension pedal for detachable clamping engagement with a vehicle foot brake having an operating shank and a foot pad, the extension including a straight channel bar, one end of which is slotted to form a pair of parallel legs terminating in upstanding right angle tongues, a clamping web struck from the bar at the inner end of the slot and bent downwardly to be vertically arranged, the bar adapted to engage the pedal with the shank positioned in the slot and in contact with the web with the tongues projecting above the pedal pad, the tongues adapted to be bent inwardly and downwardly over the edge of the pad and frictionally binding the web against the side of the shank, the bar being positioned in underlying contact with the pad and extending laterally in a horizontal plane.

4. A foot brake extension device for use with vehicles having both a foot brake pedal and a clutch pedal, the pedals having operating shanks and foot engaging pads, the extension formed of channel iron that is slotted at one end to provide a pair of spaced leg portions terminating in a pair of parallel curved tongues that serve to engage and grip over the edge of the foot brake pad, the shank of the foot brake being disposed in the slot of the bar, a web struck from the bar and vertically disposed to parallel the shank, a set screw threaded in the web for clamping engagement with the shank, the set screw forcing the tongues into gripping engagement with the pad, the bar extended laterally in a horizontal plane from the brake pedal and curved intermediate its length to pass around the clutch pedal and having its free terminal end disposed to the side of the clutch pedal.

IRBY RAY FLETCHER, Sr.

REFERENCES CITED

The following references are of record in the file of this patent:

UNITED STATES PATENTS

| Number | Name | Date |
|---|---|---|
| 888,931 | Robinson | May 26, 1908 |
| 923,354 | Gorton | June 1, 1909 |
| 1,128,975 | Harrington | Feb. 16, 1915 |
| 1,175,387 | Stanley | Mar. 14, 1916 |
| 1,242,819 | Lawrence | Oct. 9, 1917 |
| 1,302,837 | Norris | May 6, 1919 |
| 1,449,990 | Grund | Mar. 27, 1923 |
| 1,639,375 | Greenberg | Aug. 16, 1927 |
| 2,077,511 | Breese | Apr. 30, 1937 |
| 2,235,851 | Rubissow | Mar. 25, 1941 |
| 2,479,634 | Marques | Aug. 23, 1949 |
| 2,518,056 | Olsen | Aug. 8, 1950 |